United States Patent [19]

Alkofer

[11] Patent Number: 4,729,016
[45] Date of Patent: Mar. 1, 1988

[54] DIGITAL COLOR IMAGE PROCESSING METHOD AND APPARATUS EMPLOYING THREE COLOR REPRODUCTION FUNCTIONS FOR ADJUSTING BOTH TONE SCALE AND COLOR BALANCE

[75] Inventor: James Alkofer, Hamlin, N.Y.

[73] Assignee: Eastman Kodak Company, Rochester, N.Y.

[21] Appl. No.: 730,627

[22] Filed: May 6, 1985

[51] Int. Cl.$^4$ .................. G03F 3/08; H04N 1/46; G03B 27/80

[52] U.S. Cl. .................................. 358/80; 358/75; 355/38

[58] Field of Search ............... 358/75, 76, 78, 80, 358/280, 283, 284, 256; 382/18; 355/38, 68; 385/35, 40, 41, 77, 88

[56] References Cited

U.S. PATENT DOCUMENTS

| | | | |
|---|---|---|---|
| 4,410,909 | 10/1983 | Ueda et al. | 358/78 |
| 4,467,364 | 8/1984 | Konagaya | 358/76 |
| 4,472,736 | 9/1984 | Ushio et al. | 358/75 |
| 4,654,722 | 3/1987 | Alkofer | 358/284 |
| 4,667,228 | 5/1987 | Kawamura et al. | 358/80 |

OTHER PUBLICATIONS

"Tone Correction of Color Picture by Histogram Modification, " Yoichi Miyake; Nippon Shashin Sakhaishi; V. 48(2), pp. 94-101, 1980, with English Translation.

"A Statistical Method for Image Classification and Tone Reproduction Determination," by R. Chung, Journal of Applied Photographic Engineering, vol. 3, No. 2, Spring, 1977.

"A New Approach to Programming in Photomechanical Reproduction," Yu. Ovchinnikov et al; W. Banks IPC Science and Technology Press, Guildford, England, 1974, pp. 160-163.

Primary Examiner—James J. Groody
Assistant Examiner—Randall S. Svihla
Attorney, Agent, or Firm—Thomas H. Close

[57] ABSTRACT

A digital color image processing method and apparatus is characterized by producing three color reproduction functions by normalizing samples of color values from three color components of a digital image. The color reproduction functions are applied to the respective color components of the image to produce dimensionless Z values. A contrast adjusting constant is computed and the dimensionless Z values are multiplied by the constant to adjust the contrast of the processed image. Finally a constant representing the mean density for each of the color components for a particular output medium is added to the contrast adjusted Z values to produce the processed digital image.

8 Claims, 11 Drawing Figures

DIGITAL COLOR IMAGE PROCESSING METHOD AND APPARATUS EMPLOYING THREE COLOR REPRODUCTION FUNCTIONS FOR ADJUSTING BOTH TONE SCALE AND COLOR BALANCE

TECHNICAL FIELD

The invention relates to digital color image processing and more particularly, to digital color image processing wherein tone scale corrections are effected by histogram modification.

BACKGROUND ART

In the practice of digital color image processing, an original color image, such as a photographic negative, is sampled periodically in three colors (e.g. green, red and blue) to produce a digital representation of the orioginal color image. The digital color image is processed by applying digital image processing functions to improve such image qualities as sharpness, tone-scale, and color balance. The processed digital color image is then displayed on a display medium such as photographic film or paper.

Figure 2:
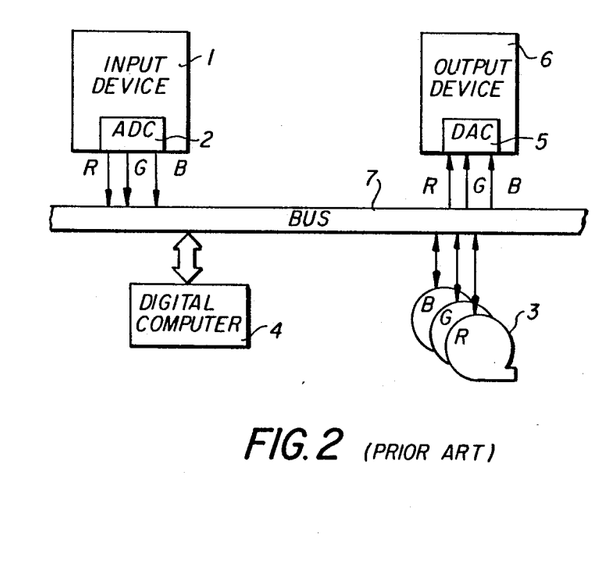
FIG. 2 is a schematic diagram illustrating generic prior-art digital color image processing apparatus useful for practicing the present invention.

FIG. 2 is a schematic diagram illustrating apparatus for digital image processing. Such apparatus includes an input device 1 for sampling the original color image in each of three colors, and analog-to-digital converters 2 for producing the digital color image in the three colors. Commonly employed input devices include drum and flat bed scanners, linear and area solid state image sensing arrays, and CRT and laser flying spot scanners, each being provided with appropriate color filters to produce the color separations.

Each digital color separation image is stored in a mass storage memory 3, such as a solid state memory frame-buffer, magnetic tape or disc storage device. A digital computer 4 applies the various image processing functions to the digital color image to produce the processed digital color image.

The digital computer 4 may comprise a main frame general purpose digital computer, or for higher speed operation, a digital computer specially configured for high speed digital processing of color images.

The processed digital color image is converted to sampled analog form by digital-to-analog converters 5 and is displayed on an output device 6 such as a drum or flat bed graphic arts scanner, or a CRT or laser flying spot scanner. The elements of the image reproduction apparatus communicate via a data and control bus 7.

As noted above, among the processing functions performed by the digital computer are the improvement of the tone-scale and color balance of the color image. In the article entitled "Tone Correction of Color Picture by Histogram Modification" by Yoichi Miyake, Nippon Shashin Sakhaishi, V. 48(2), pp. 94–101, 1980, the author proposes a digital color image processing method wherein the tone-scale corrections are effected by modifying the histogram of color values of the green separation image. Color corrections are implemented by solving a conventional set of color masking equations of the form:

$$R' = a_{11}R + a_{12}G = a_{13}B \quad (1)$$

$$G' = a_{21}R + a_{22}G = a_{23}B \quad (2)$$

$$B' = a_{31}R + a_{32}G = a_{33}B \quad (3)$$

where the matrix of color correction coefficients $a_{ij}$ are determined primarily by the characteristics of the input and output media.

In the field of optical photographic printing, it is well known to adjust the coefficients $a_{ij}$ of the masking equations to correct for "problems" in the color balance of the original, such as a color negative film balanced for daylight exposure that was exposed under tungsten lighting conditions. The correction is usually based upon the hypothesis that the large area integral of the colors in any scene should add up to a shade near gray. Full correction, i.e. forcing the integrated colors in the processed image all the way to gray will correct for problems in the original image caused by such factors as film keeping (i.e. problems that manifest themselves after the film has been stored for a time under conditions causing degradation of the film), incorrect exposure, or an improper match between the illuminant and the film balance. On the other hand, for scenes that do not obey the assumption that all the colors add up to gray (commonly called color subject failure scenes), full correction introduces unwanted color shifts in the printed image. Often some compromise between zero and full correction is employed in optical printers based upon the average characteristics of an expected population of photographic negatives.

This approach results in a large percentage of acceptable prints, but has a shortcoming in that it may not produce an "optimum correction" for any given original. Furthermore, there exists a class of "problem" originals that simply cannot be corrected by adjusting the coefficients of the masking equation. This class includes those originals in which the sensitometric curves cross each other. This phenomenon is caused, for example, by severe abuse to the original such as exposure of undeveloped photographic film to formaldehyde.

The objects of the present invention are directed to providing a digital color image processing method for adjusting the tone-scale and color balance of the processed image that overcome the shortcomings noted above.

DISCLOSURE OF THE INVENTION

The objects are achieved according to the present invention by adjusting both tone-scale and color balance of a digital color image by modifying the histograms of each of three primary colors in the image.

The method is based upon two principle observations regarding the statistical properties of the color values in a high quality color image. The first of these principles is that a truly random sample of color values (e.g. photographic density or log radiance) in a high quality color image will form a normal (Gaussian) distribution. The second principle is that the standard deviation of a random sample of color values is invariant with wavelength. That is to say, a truly random sample of color values in one color will have the same standard deviation as a truly random sample in another color.

The first principle noted above implies that a function that normalizes a random sample of color values will serve well as a color reproduction function, assuming that any deviation from normality in the random sample was caused by some "problem" with the original. The first principle combined with the second principle noted above implies that color values in all three colors having an equal distance in their number of standard deviations from the mean of their respective color distributions should always combine to produce a shade of gray.

Applying these principles to a digital color image processing method, a color reproduction function for each of three primary colors of the image is generated by normalizing a random sample of color values from each of the three colors. The color components of the digital color image are processed with the color reproduction functions for the respective colors to generate processed digital color image.

In a preferred embodiment of the invention, the sample of color values used to generate the color reproduction functions are taken from an image dependent "floating" contrast interval to optimize the randomness of the sample. The floating contrast interval is selected as a function of the shapes of the histograms of color values for the three primary colors in the contrast interval. This method of choosing a sample of image values is the subject of copending U.S. patent application Ser. No. 730,630, now. U.S. Pat. No. 4,654,722. In the preferred embodiment of the invention, the color reproduction functions relate input color values to values of a standard normal variate. The term standard normal variate refers to a scale representing the number of standard deviations of a normal (Gaussian) distribution having a mean of zero and a standard deviation of one. Color components of the digital color image are processed by the color reproduction function to yield dimensionless Z values. The contrast of the processed image is determined by multiplying the Z values by a constant. The color balance of the processed image is determined by adding constants to the processed Z values. The constants represent the mean densities of the output medium for the respective color. The basic method of generating a tone reproduction function and determining contrast in this way is the subject of copending U.S. patent application Ser. No. 730,629.

According to one embodiment, the function of histogram shapes employed to select the contrast interval is the normality of the histogram in one of the three colors, weighted by the similarity of the shapes of the histograms in the other two colors to the one. In another embodiment, the function of histogram shape is the similarity in shapes of all the color histograms in a given contrast interval.

In one embodiment of the invention, the multiplicative constant employed to adjust the tone-scale of the processed image is generated as a function of the standard deviation of the sample of color values in one of the colors (i.e. green).

In an embodiment where the digital image was generated by sampling photographic film having a film grain structure, the image is sampled at full system resolution in three primary colors, then the color values in all three colors are block averaged prior to generating the color reproduction functions to reduce the effects of grain on the sampling process. After the color reproduction functions are generated, the full resolution digital color image is processed.

As a further refinement of the method, the total number of color values in each contrast interval is counted, and only the contrast intervals having a number of values greater than some predetermined minimum number are considered for generating the color reproduction functions. This is done to insure a statistically significant sample of color values.

BRIEF DESCRIPTION OF THE DRAWINGS

The invention is described with reference to the drawings, wherein.

MODES OF CARRYING OUT THE INVENTIONS

Figure 1:
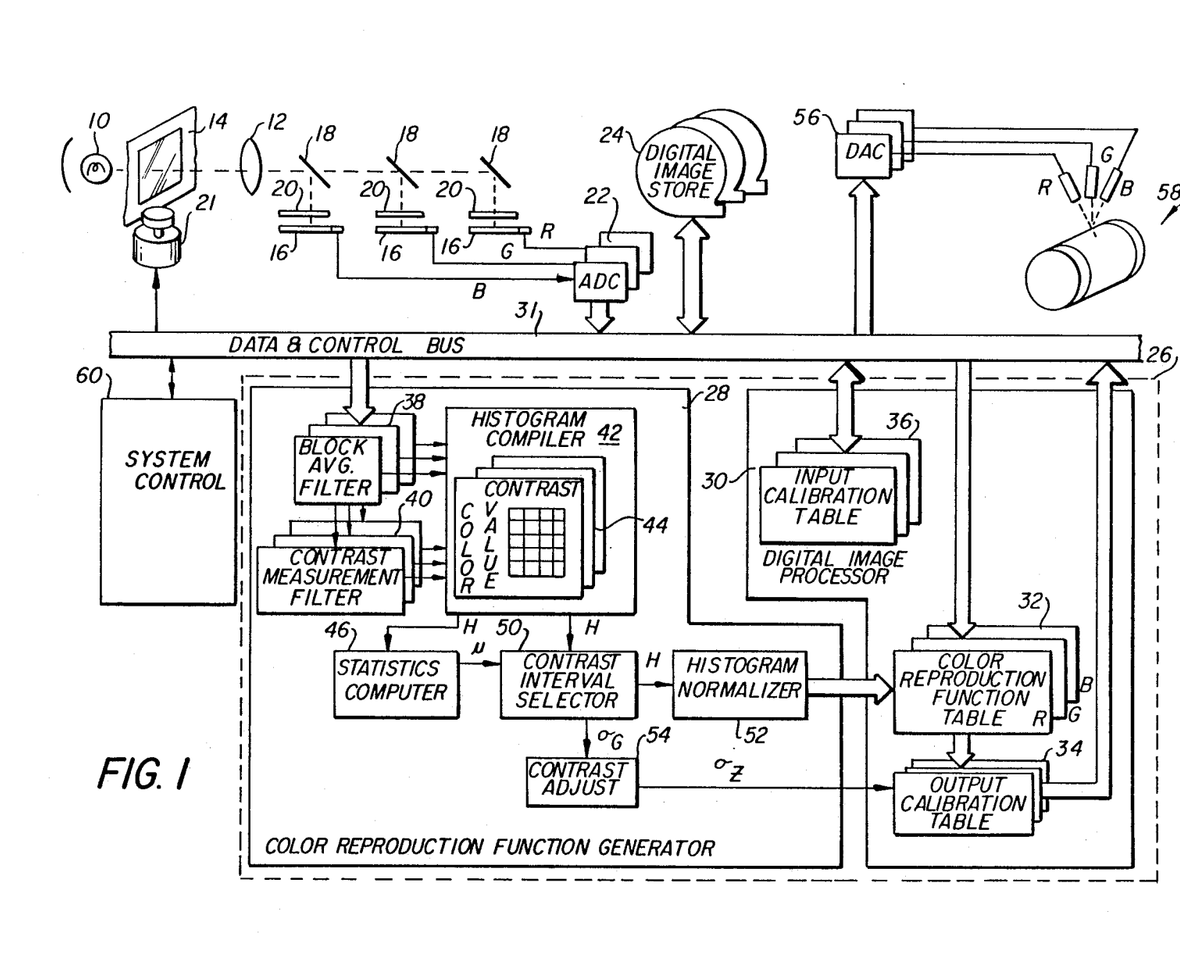
FIG. 1 is a schematic diagram, illustrating a scanning color photographic printer for carrying out the digital color image processing method according to the present invention.

Turning now to FIG. 1, an example of a scanning color photographic printer used to practice the present invention will be described.

The input device includes a light source 10 and lens 12 for projecting an image of color negative film 14 onto these solid state image sensing arrays 16, such as CCD image sensors. The image is directed to the image sensing array 16 by dichroic beam splitters 18 through color trimming filters 20 to form a red, green and blue separation image on the respective image sensors. A film advance motor 21 advances the film in the printer. The image sensors 16 scan the color photographic negatives to produce three color separation signals R, G and B. The signals thus produced are supplied to analog-to-digital converters 22 that each produce an 8-bit output code representing one of 256 possible signal levels for each sample point in the three colors.

The digital color image signals are stored in a digital image storage memory 24, such as a magnetic tap, disc, or solid state semiconductor memory. The digital color image signals are processed in a digital computer 26. A DEC 2060 mainframe computer was used.

The digital computer 26 is programmed to include a color reproduction function generator 28 and a digital image processor 30 that applies color reproduction functions generated by color reproduction function generator 28 to the digital color image. The color reproduction function generator 28 receives the digital color image from the digital image storage device 24 via data and control lines 31 and generates a color reproduction function table 32 for each color. The color reproduction function generator 28 also generates a multiplicative constant $\sigma_z$ for adjusting the contrast of the processed image as described below and supplies the contrast to three output calibration tables 34.

Prior to storing the digital color image in digital image store 24, each input signal level is converted to an input color value, such as photographic density, by a known scanner calibration function. The calibration function for each color is implemented in the form of a look up table 36 in the digital image processor 30 to convert each 8-bit input value to an 8-bit value representing the color negative density at the scanning point.

The color reproduction function generator 28 includes digital filters 38 for performing a block average of the color values of the color components of the digital color image. Digital filters 40 measure the contrast of the image around each block averaged color value in each of the three colors. A histogram compiler 42 compiles the block averaged color values from a plurality of contrast intervals in each color, in a plurality of histogram memories 44.

Figure 3:
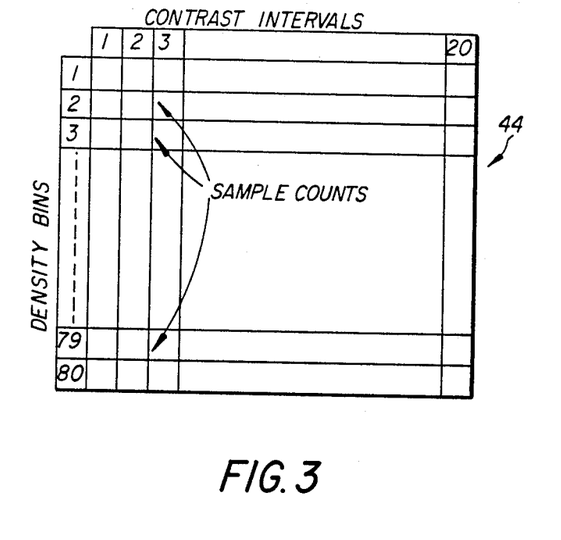
FIG. 3 is a schematic diagram showing the organization of the histogram memories.
Figure 4:
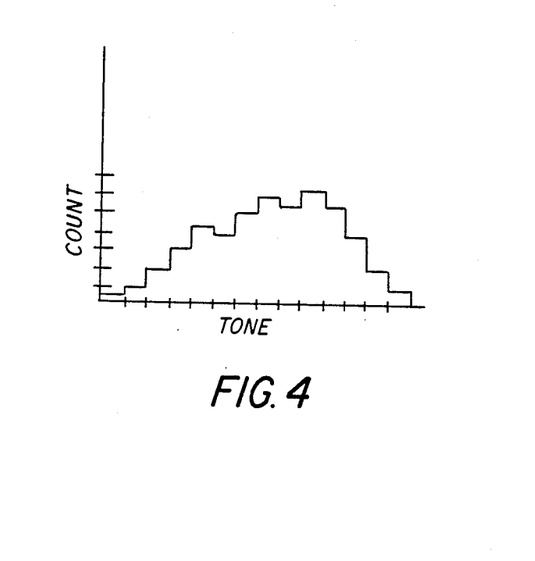
FIG. 4 is a graph illustrating a color value histogram from one of the contrast intervals shown in FIG. 3.

FIG. 3 shows, in a graphic way, the organization of each of the histogram memories 44. There are twenty contrast intervals for each color, having a width of 0.04 log contrast units each. The width of the contrast intervals is chosen to be approximately twice the minimum visual log contrast threshold. The width of the contrast intervals represents a tradeoff between randomness of sampling (the narrower the interval, the greater the randomness) and achieving a sample size that is statistically significant. The 256 color values are divided into 80 color value (density) bins, for a resolution of 0.05 density units per density bin. Counts are accumulated in the appropriate density bins in the histogram memories until all of the color values from the digital color image are counted. FIG. 4 shows a graphic example of one of the color histograms representing one of the contrast intervals in one of the three colors.

Returning to FIG. 1, a statistics computer 46 in the color reproduction function generator 28 computes the statistical moments $\mu$ of the histograms H in the histograms memories 44 as described below.

A contrast interval selector 50 receives the statistical moments $\mu$ from the statistics computer 46 and selects a contrast interval on the basis of the statistical moments of the color value distributions in the contrast intervals and supplies the histograms H from the selected contrast interval to a histogram normalizer 52. The histogram normalizer 52 normalizes the histograms from the selected contrast interval to generate the color reproduction function lookup tables 32 that are used by the digital image processor 30.

A contrast-adjustment computer 54 receives the standard deviation $\sigma_G$ of the green color values in the selected contrast interval and generates a multiplicative constant $\sigma_z$ used to determine the contrast of the processed image in output device calibration tables 34. All the processed color values in all three colors are multiplied by this same constant.

The color reproduction function lookup tables 32 relate each of the 256 possible input values in the respective colors to one of 256 possible output values. After the color reproduction function lookup tables 32 have been generated, the digital image processor 30 processes the digital image by applying the color reproduction functions to the respective color components of the digital color image. The output calibration functions are then applied to the respective color components of the processed digital color image. The processed digital color image is converted back to analog form by digital-to-analog converters 56. The processed analog signal is then applied to the output scanning device 58 to reproduce the image. The output device 58 is a drum-type scanner having red, green and blue laser light sources that are modulated by the respective analog color signals to expose a light sensitive medium such as color photographic paper.

System control electronics 60 controls and coordinates the operation of the input and output scanning devices and the digital image processing computer 26.

Figure 5:
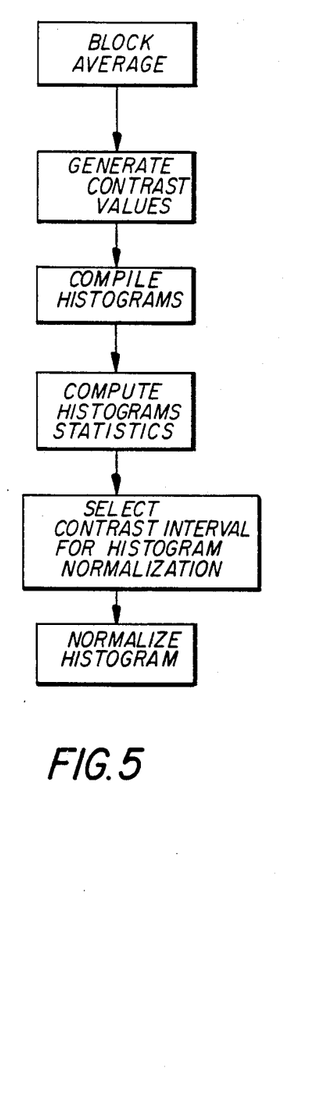
FIGS. 5, 6, 7A, 7B, and 8 are flow charts illustrating the method of generating the color reproduction functions according to the present invention.

The method of generating the color reproduction functions will now be described in more detail with reference to the flow charts of FIGS. 5-7.

Referring first to the flow chart of FIG. 5, the processing steps performed on the color digital image to generate the respective color reproduction functions will be described. All three color components are processed through these steps. First a block average of the color values of the sampled digital image is formed. This is accomplished by applying a digital filter to the digital image color values of the form:

$$\begin{bmatrix} 1 & 1 & 1 & 1 \\ 1 & 1 & 1 & 1 \\ 1 & 1 & 1 & 1 \\ 1 & 1 & 1 & 1 \end{bmatrix} /16. \quad (4)$$

This averaging is performed by the block average filters 38 shown in FIG. 1, to reduce the effects of film grain and other sources of noise on the color value statistics.

Next, a digital filter representing a Laplacian operator of the form:

$$\begin{bmatrix} 0 & -1 & 0 \\ -1 & 4 & -1 \\ 0 & -1 & 0 \end{bmatrix}; \quad (5)$$

is applied to the block averaged color values of the digital image to measure the contrast of the image at each block averaged sample point. This operation is performed by the contrast measurement filters 40 in FIG. 1. The Laplacian operator has the properties of exhibiting no response to uniform areas or linear gradients, and exhibits a response only to changes in gradients. The Laplacian operator works well in measuring the contrast of the modulated color components of the image. However, it is to be understood that other contrast measuring filters may be employed with the present invention.

The respective histograms in each contrast interval for each color component are compiled as discussed above, and their statistics computed. A contrast interval is selected on the basis of the shape of the histograms of the respective color values in the interval and the histograms of color values in the selected contrast interval are normalized to generate the respective color reproduction functions.

Figure 6:
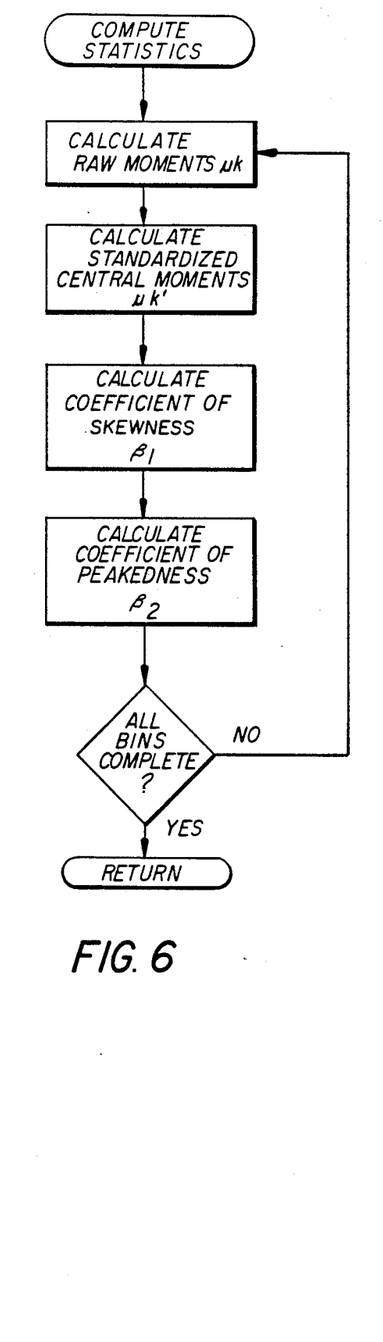

FIG. 6 is a flow chart showing the steps involved in computing the histogram statistics. The raw moments $\mu_k$ taken about the means, are computed as follows:

$$\mu_k = \frac{1}{N}\left(\sum_{i=1}^{N}(x_i - \bar{x})^k\right) \quad (6)$$

where

N is total number of samples in the contrast interval;
$x_i$ is a color value; and
$\bar{x}$ is the mean color value.

The standardized central moments $\mu'_k$ are calculated as follows:

$$\mu'_k = \frac{\mu_k}{\sigma^k}, \text{ where } \sigma = \sqrt{\mu_2} \quad (7)$$

The coefficient of symmetry (coefficient of skewness) for each distribution is then represented as $$\beta_1 = (\mu'_3)^2 \quad (8)$$

and the coefficient of peakedness (kurtosis plus 3) is presented as $$\beta_2 = \mu'_4 \quad (9)$$

Figure 7A:
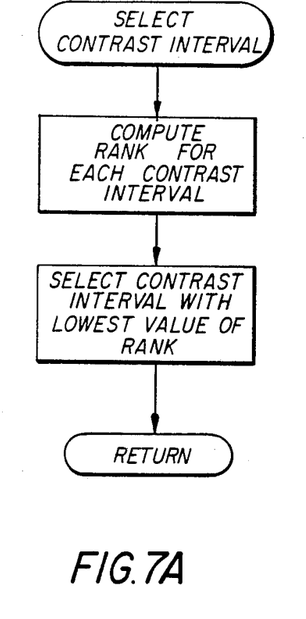
Figure 7B:
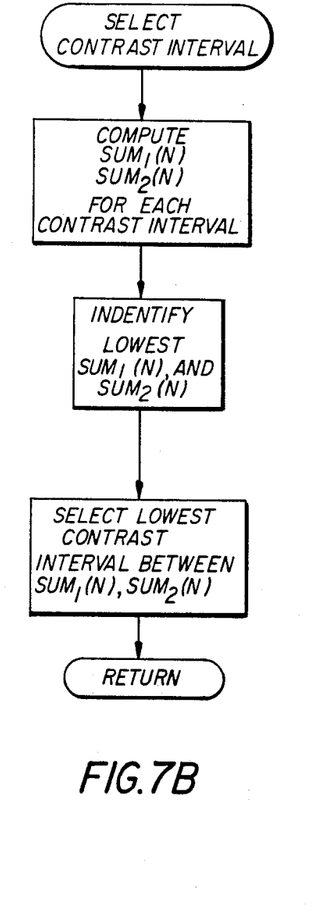

Referring now to FIG. 7A, the steps involved in selecting the contrast interval according to one embodiment of the invention will be described. One selection criteria that has been found to work well is a combination of the normality of the sample of green color values and the sameness of the distribution of the red and blue color values. A function called RANK is defined as follows:

$$\text{RANK} = \sqrt{\beta_{1G}^2 + (\beta_{2G} - 3)^2} + |\beta_{1R} - \beta_{1G}| + \quad (10)$$

$$|\beta_{2R} - \beta_{2G}| + |\beta_{1B} - \beta_{1G}| + |\beta_{2B} - \beta_{2G}|$$

where $\beta_{1G}$ is the skewness of the distribution of green color values in the contrast interval being evaluated, etc.

The contrast interval with the lowest value of RANK is selected.

In a presently preferred alternative embodiment of the invention, (shown in FIG. 7B) the contrast interval selection criteria involves the similarity of shape of the three color value distributions in the contrast interval. The selection criteria compares the skewness of the color value distributions in each of the contrast intervals as follows:

$$\text{SUM}_1(N) = |\beta_{1R} - \beta_{1G}| + |\beta_{1B} - \beta_{1G}| + |\beta_{1R} - \beta_{1B}| \quad (11)$$

where $\text{SUM}_1$ (N) is a measure of the difference in skewness between the three color value distributions in the Nth contrast interval. The contrast interval having the most similar distribution, i.e. the lowest value of $\text{SUM}_1$ (N) is identified.

Next, the peakedness of the three color value distributions in each contrast interval is compared as follows:

$$\text{SUM}_2(N) = |\beta_{2R} - \beta_{2G}| + |\beta_{2B} - \beta_{2G}| + |\beta_{2R} - \beta_{2B}| \quad (12)$$

where $\text{SUM}_2(N)$ is a measure of difference in peakedness between the three color value distribution in the Nth contrast interval. The contrast interval having the most similar distributions, i.e. the lowest value of $\text{SUM}_2$ (N) is identified.

Finally, the lowest contrast interval (i.e. the interval representing the lowest contrast) between the two identified contrast intervals is selected.

Optionally, to insure that there is a statistically significant number of color values in the contrast interval, a check on the total count of color values in the interval is performed. If the total count in each color is less than some predetermined number, say 1000, the contrast interval is not selected. This check is continued until a contrast interval having at least the required minimum number of color values is chosen.

Figure 8:
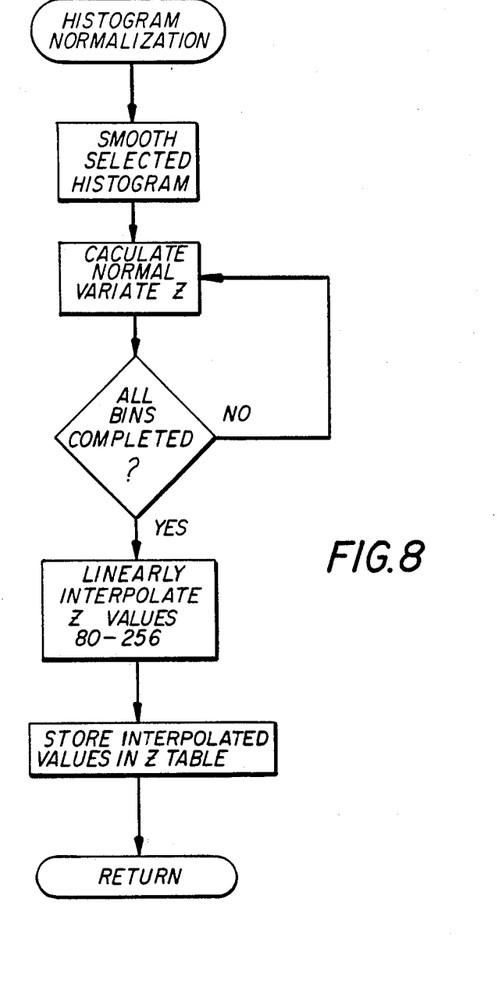

Turning now to FIG. 8, the steps involved in normalizing the color histograms in the selected contrast interval to generate the color reproduction funcations will be described. To normalize a histogram, the standard normal variate Z for all 80 color value bins in the contrast interval is computed. First however, an average smoothing operation is performed on the selected histogram to remove any spikes. The smoothing is performed on the counts in 3 consecutive color value bins as follows:

$$h_i = \tfrac{1}{3}(h'_{i-1} + h'_i + h'_{i+1}) \quad (13)$$

where $h'_i$ is the count in bin i and $h_i$ is the smoothed value.

Next, the standard normal variate Z is calculated for the smoothed values of the histogram as follows (from *Approximations for Digital Computer*, Hastings C., Princeton Univ. Press.):

$$Z_j = t_j - \frac{a_0 + a_1 t_j}{1 + b_1 t_j + b_2 t_j^2} \quad (14)$$

where $$t_j = \sqrt{\ln(1/P_j^2)}$$

$a_0 = 2.30753 \quad b_1 = .99229$
$a_1 = 0.27061 \quad b_2 = .04481$

The probability $P_j$ for each of the 80 bins is given by $$P_j = \frac{\sum_{i=1}^{j} h_i}{\sum_{i=1}^{80} h_i} \quad (15)$$

where $h_i$ are the smoothed counts in the ith color value bin, and j=1 to 80.

Next, the Z values are linearly interpolated from 80 to 256 values to provide a Z value for each of the 256 possible scanner inputs represented by the 8-bit digital code. Finally the 256 Z values are stored in the color reproduction function lookup tables 32. This process is applied to each of the three samples of color values in the selected contrast interval.

Figure 9:
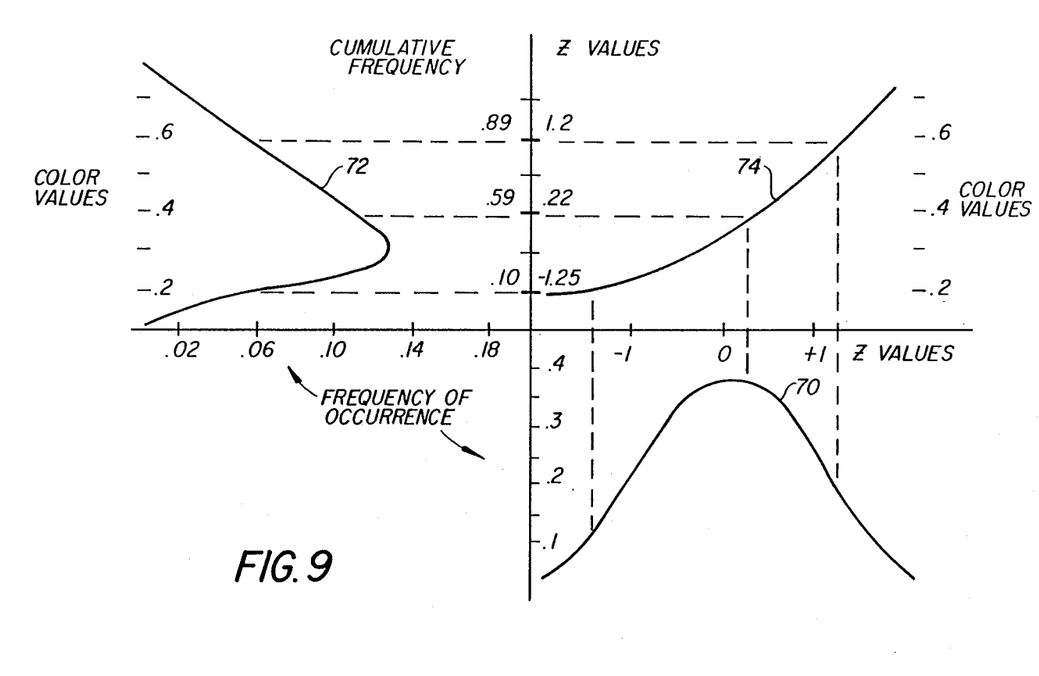
FIG. 9 is a graph showing the form of the color reproduction functions generated according to the method outlined in FIG. 8.

FIG. 9 is a graph showing the form of the color reproduction functions produced by normalizing the samples of color values. In the lower right quadrant of the graph, curve labeled 70 represents a standard normal distribution showing the probability of the occurrence of a value plotted against the standard normal variate Z. In the upper left quadrant of the graph, the curve labeled 72 represents the sample of color values from the image plotted against relative probability of occurrence. The central ordinate of the graph relates the relative probability $P_j$ of the color value distribution to Z values according to the relationship defined by equation 14. The color reproduction curve, labeled 74, maps the Z values on the ordinate to the same Z values on the abcissa. A color value scale on the far upper right of the diagram, congruent to the color value scale on the far left, shows how the color reproduction function relates color values to Z values.

After the three color reproduction function lookup tables are generated, all of the color values of the image are processed by applying the respective color reproduction functions to them. At this point, the processed color samples from the image are dimensionless quantities representing the Z values.

To recover the processed image, these dimensionless quantities are given magnitudes with respect to the original image and the output medium by multiplying the Z values with a multiplier $\sigma_z$ that adjusts the contrast of the processed image. To adjust the color balance of the image, a constant term is added to each of the three color values. The constant term relates the Z values in each color to the mean density of the output medium for the respective color, thereby causing equal Z values in all three colors to be reproduced as a shade of gray.

Appropriate values for the multiplier $\sigma_z$ that adjusts contrast and the additive constants that determined the color balance of the processed image are determined as follows. The multiplier is computed based on the statistics of the green color values alone, but is applied to all three colors. The intrinsic contrast of natural scenes can be quantified in terms of the standard deviation of log reflectance of edges in the scene or the density representation of those log reflectances in the photographic image. On the average the approximate relationship between the two is given by:

$$\sigma_D = G \cdot \sigma_R \quad (16)$$

where:
$\overline{G}$ = average gradient of the photographic film (relates $\sigma_R$ to some specific reproduction medium contrast)
$\sigma_R$ = standard deviation of log reflectance based on a large number of original scenes
$\sigma_D$ = standard deviation of density Typical values for $\sigma_R$ and $\overline{G}$ for color photographic film are 0.31 and 0.68 respectively, such that $\sigma_D$ is 0.21. Departures from this average contrast must be compensated. A general equation may be stated as:

$$\sigma_z = m \cdot f(\sigma_s) + b \quad (17)$$

where:
$\sigma_s$ = individual scene standard deviation, from the selected contrast interval
m and b are system dependent constants and
$f(\sigma_s)$ is some function of the sample standard deviation
$\sigma_z$ = the multiplier applied to the values obtained from the color reproduction function.

A simple and satisfactory implementation is obtained from:

$$b = \sigma_D(1.0 - m) \quad (18)$$

$$\sigma_z = m \cdot \sigma_s + b \quad (19)$$

where:
m is typically between 0.6 and 0.8 and $\sigma_s$ is the standard deviation of the sample of green color values.

The sign of $\sigma_z$ is positive if the reproduction has the same polarity as the original image (negative-to-negative or positive-to-positive). If the production has a polarity of an opposite sense with respect to the original, e.g., negative-to-positive, then the sign of $\sigma_z$ is negative.

Note that the adjustment of the contrast in (19) does not affect scenes having the average contrast ($\sigma_D$), nor does it affect the mean value of tone in the scene, since in terms of Z (the normal variate) the average value remains 0. This is not only a computational convenience in terms of adjusting the contrast, but also in adjusting the color balance of the processed image with respect to the reproduction medium. For example, if a color negative image is to be printed directly onto color photographic paper, the log exposure for the desired mean paper density for each color is simply added to the translated, contrast adjusted values of the respective colors. The complete calculation is given by:

$$\log E_{ZD} = -\sigma_z Z_D + \log E_Z \quad (20)$$

where:
$\log E_A$ = log exposure required to obtain the aim paper density
$Z_D$ = translated Z value for some input density in the original image
$\log E_{ZD}$ = log exposure for $Z_D$.

Figure 10:
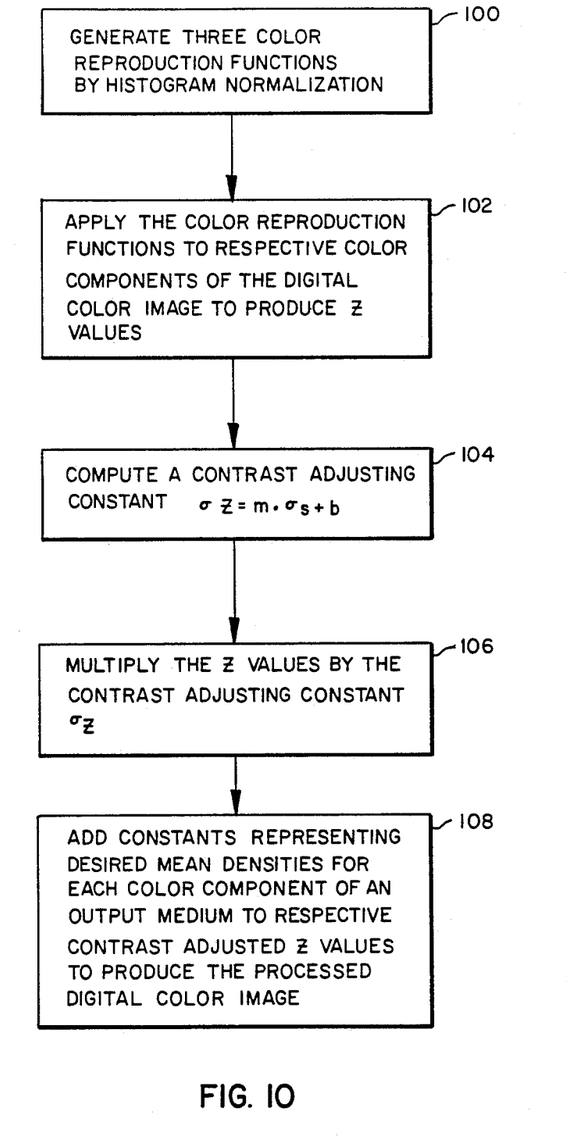
FIG. 10 is a flow diagram summarizing the steps of processing a digital image according to the invention.

The steps of processing a digital image according to the invention as described above are summarized in FIG. 10. First the three color reproduction functions are generated (100) by normalizing samples of color values from the three color components of the image. The color reproduction functions are applied to the respective color components of the image to produce Z values (102). A contrast adjusting constant $\sigma_z$ is computed (104); and the Z values are multiplied by the constant $\sigma_z$ to adjust the contrast of the processed image (106). Finally, constants representing the desired mean density for each of the color components for a particular output medium are added to the respective contrast adjusted Z values to produce the processed digital image (108).

INDUSTRIAL APPLICABILITY AND ADVANTAGES

The digital color image reproduction method according to the present invention is useful in the graphic arts and photographic printing fields to provide automatic tone-scale adjustment and color balance of digitally processed images. The method is advantageous in that a greater percentage of high quality images are produced automatically, without the need for operator intervention, than by the methods of the prior art.

By processing the color values according to the present invention to yield dimensionless quantities relating to the statistical distribution of color values, the tone-scale and color balance of the processed image are easily adjusted by the simple acts of multiplying the processed values by a constant to adjust the tone-scale, and adding a constant to the tone values in each color representing the mean density of the output medium to adjust the color balance. Because the processing of the original digital color image does not involve dimensioned quantities until the last step, the processing is completely independent of the output medium until the last step is performed. The method therefore has the advantage that changing from one output medium to another is easily accomplished by simply changing the constants represeting that mean density of the output medium desired. Under and over exposure are automatically compensated, since the correction depends on the expectation of normally distributed density, and not on a priori information about film sensitometric characteristics. An additional advantage of the method according to the present invention is that color corrections are automatically performed by the method that would be impossible using the prior art methods.

I claim:

1. A method for processing a digital color image having three color components, characterized by: separating color values from each of the three color components of the digital color image into a plurality of samples of color values corresponding to a plurality of contrast intervals, selecting one of the plurality of samples of color values from each color component corresponding to one of the plurality of contrast intervals based upon the similarity of the shapes of the distributions of the color values in the selected samples of color values, generating a color reproduction function for each of the color components by normalizing the selected samples of color values, and processing the color components of the digital color image by applying the color reproduction functions to the respective color components of the digital color image to produce a processed digital color image.

2. The method claimed in claim 1 further characterized by the step of displaying the processed digital color image on an output medium with a desired mean density for each color component, said color reproduction functions relating color values to values of a standard normal variate Z and being applied to the color values of the digital color image to produce processed color values, the contrast of the digital color image being determined by multiplying the processed color values by a constant $\sigma_z$ to produce contrast-adjusted processed color values, and the contrast-adjusted processed color values being adjusted with respect to the output medium by adding a constant representing the desired mean density of the output medim for each color component to the contrast-adjusted processed color values of the respective color component.

3. The method claimed in claim 2, further including the steps of: computing the standard deviation of one of the selected samples of color values, and forming said constant $\sigma_z$ as a function of the standard deviation of said one of the selected samples of color values.

4. The method claimed in claim 3, wherein said function is of the form:

$$\sigma_z = m \cdot \sigma_s + b$$

where
$\sigma_s$ is the standard deviation of said one of the selected samples of color values, and
m and b are system-dependent constants.

5. A method for processing a digital color image having three color components to produce a processed digital color image having an adjusted tone scale and color balance, the processed digital color image to be displayed on an output medium with a desired mean density for each of the three color components, characterized by:

(a) generating a color reproduction function for each of the three color components by normalizing a random sample of color values from each of the color components of the digital color image, the color reproduction functions relating color values to values of a standard normal variate Z;

(b) processing the color values of the three color components of the digital color image using the respective color reproduction functions to generate processed color values representing Z values;

(c) multiplying the processed color values by a constant $\sigma_z$ to produce contrast-adjusted processed color values, thereby adjusting the contrast of the digital color image; and (d) adding a constant representing the desired mean density of the output medium for each of the three color components to the contrast-adjusted processed color values of the respective color component, thereby adjusting the color balance of the digital color image and producing the processed digital color image.

6. The method claimed in claim 5, wherein the random samples of color values employed to generate the color reproduction functions are each selected from a plurality of samples of color values from the respective color component corresponding to a plurality of contrast intervals based upon the similarity in the shapes of the distributions of the color values in the selected samples of color values.

7. The invention claimed in claim 5, further including the steps of: computing the standard deviation of one of the selected samples of color values, and forming said constant $\sigma_z$ as a function of said standard deviation.

8. Apparatus for processing a digital color image having three color components to produce a processed digital color image having improved tone scale and color balance, the processed digital color image to be displayed on an output medium with a desired means density for each of the three color components, comprising:

(a) means for separting color values from each of the three color components of the digital color image into a plurality of samples of color values corresponding to a plurality of contrast intervals;

(b) means for selecting one of the plurality of samples of color values from each of the color components corresponding to one of the contrast intervals based upon the similarity in the shapes of the distributions of the color values in the selected samples of color values;

(c) means for generating three color production functions by normalizing the selected samples of color values, the color reproduction functions relating color values to values of a standard normal variate Z;

(d) means for processing the color values of the digital color image by applying the color reproduction functions to the color values of the respective color components of the digital color image to generate processed color values representing Z values;

(e) means for generating a contrast adjusting constant $\sigma_z$, including means for computing the standard deviation of one of the selected samples of color values and generating the constant $\sigma_z$ as a function of the standard deviation;

(f) means for multiplying the processed color values representing Z values for all three color components by the contrast adjusting constant $\sigma_z$ to produce contrast-adjusted processed color values, thereby adjusting the contrast of the digital color image;

(g) means for adding a constant representing the desired mean density of the output medium for each of the three color components to the contrast-adjusted processed color values of the respective color component, thereby adjusting the color balance of the digital color image and producing the processed digital color image.

* * * * *